United States Patent [19]
Cook

[11] 3,791,357
[45] Feb. 12, 1974

[54] ELECTRICAL MEANS FOR VARYING SPARK TIMING OF AN INTERNAL COMBUSTION ENGINE

[75] Inventor: Harvey A. Cook, Cleveland, Ohio
[73] Assignee: TRW Inc., Cleveland, Ohio
[22] Filed: Dec. 15, 1971
[21] Appl. No.: 208,144

[52] U.S. Cl............................................ 123/117 R
[51] Int. Cl............................................ F02p 5/04
[58] Field of Search ...................... 123/117 R, 117 A

[56] References Cited
UNITED STATES PATENTS

| 3,596,643 | 8/1971 | Schweitzer...................... | 123/117 A |
| 3,142,967 | 8/1964 | Schweitzer...................... | 123/117 A |
| 3,626,455 | 12/1971 | Toda................................ | 123/117 A |
| 3,593,693 | 7/1971 | Seelmann........................ | 123/117 A |

FOREIGN PATENTS OR APPLICATIONS

| 1,125,230 | 9/1960 | Germany ............................ | 123/117 |

*Primary Examiner*—Laurence M. Goodridge
*Assistant Examiner*—Ronald B. Cox
*Attorney, Agent, or Firm*—Hill, Sherman, Meroni, Gross & Simpson

[57] ABSTRACT

An ignition system for an internal combustion engine including a multi-breaker point distributor in which the respective sets of points are arranged at mutually offset and overlapping dwell angles. Electric circuitry is provided to selectively connect and disconnect the various sets of points to vary the total length of dwell and thus the ignition timing. A commutator can be used to alternately connect and disconnect the various sets of points, thereby continuously and relatively advancing and retarding the ignition timing between predetermined limits from a variable zero position. A sensing device can be employed to sense variations in an engine operating condition and relatively advance or retard the zero position of the ignition timing to maintain a predetermined value of the operating condition.

11 Claims, 4 Drawing Figures

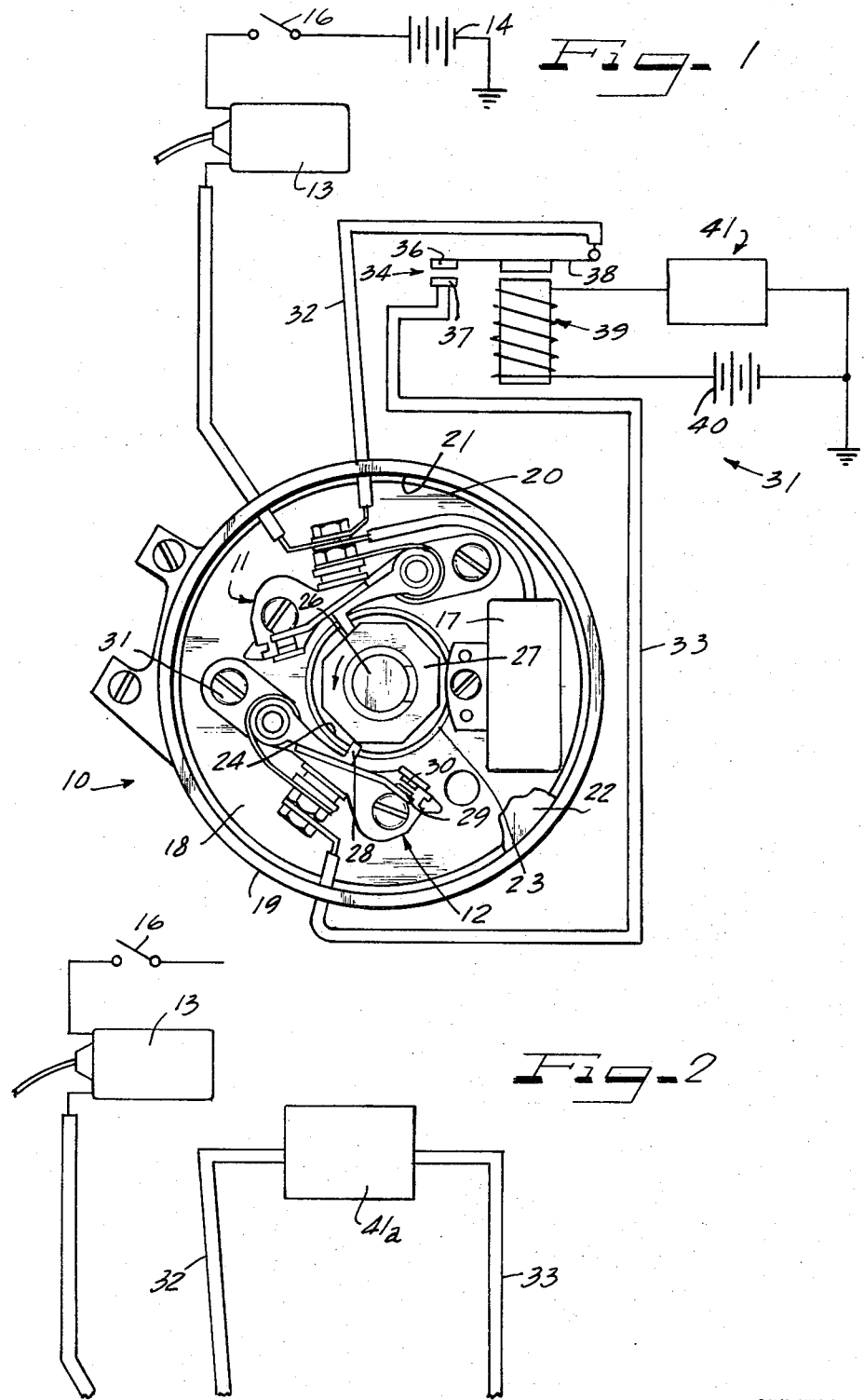

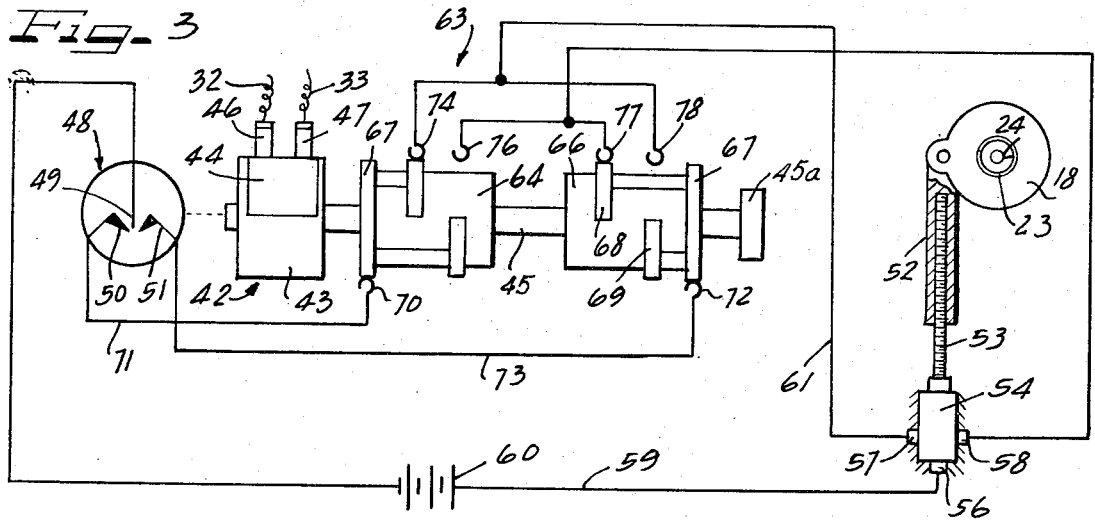
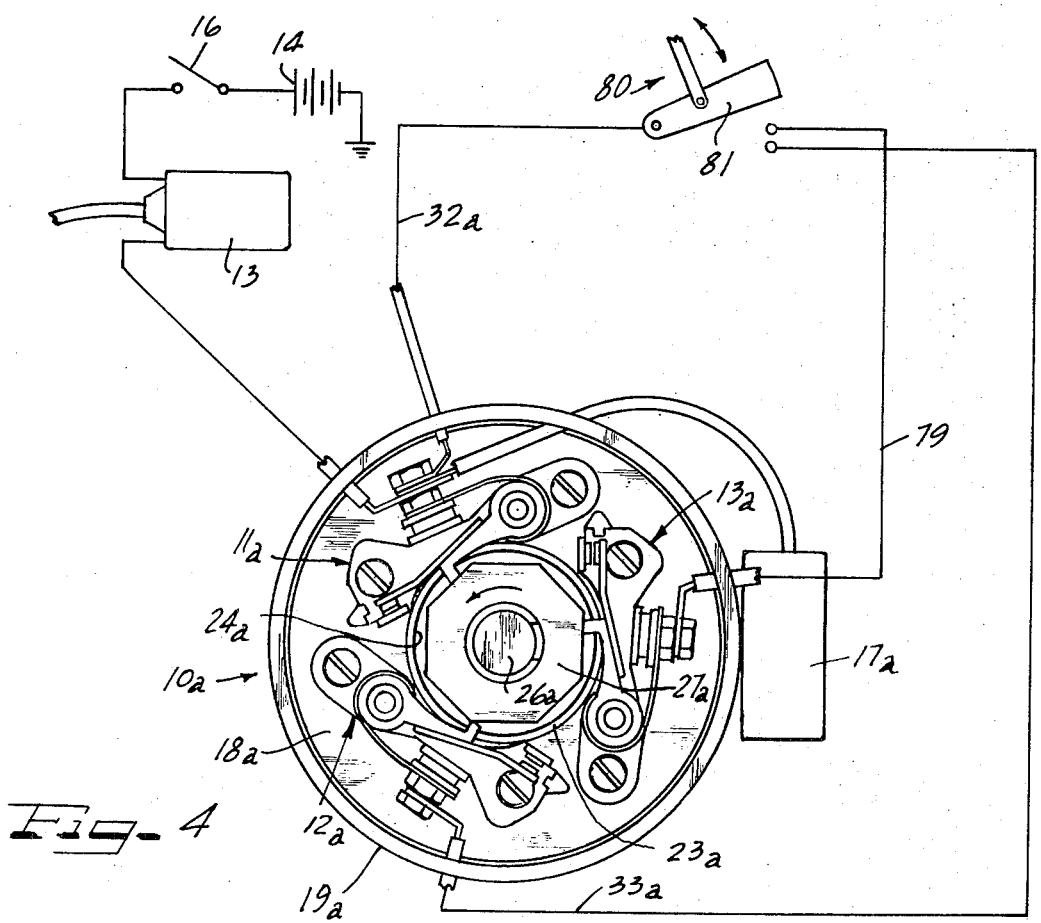

ELECTRICAL MEANS FOR VARYING SPARK TIMING OF AN INTERNAL COMBUSTION ENGINE

BACKGROUND OF THE INVENTION

This invention relates generally to the field of ignition systems for internal combustion engines and more particularly to an ignition system in which the timing can be varied at predetermined relatively advanced and retarded positions or varied in response to variations in an engine operating parameter or the like to maintain a predetermined level or value of that condition.

The spark timing of internal combustion engines has long been varied in an effort to improve engine performance, to assist in starting and to enhance combustion during various operating conditions. More recently spark timing has been controlled to reduce exhaust emissions under certain engine operating modes.

The distributors that are commonly employed in the ignition systems of internal combustion engines are equipped with centrifugal and vacuum spark controls. Both are connected to the breaker plate of the distributor, which is arranged for pivotal movement, to vary the timing of the spark in response to variations in engine speed and carburetor vacuum. More recent distributors are equipped with a second vacuum control connected to intake manifold vacuum to provide additional ignition timing retard during periods of closed throttle idle, thereby assisting in the reduction of exhaust system hydrocarbon emission.

It is desirable that any additional ignition timing control for the purpose of reducing exhaust emissions or the like be superimposed upon the conventional centrifugal and vacuum spark controls. It is also desirable that any additional spark timing variation be accomplished with a minimum of moving parts and without interfering in any way whatsoever with the operation of the existing centrifugal or vacuum advance systems.

The present invention involves a method of and means for providing an additional spark timing variation responsive to any one of a number of engine operating parameters. The variation may be accomplished by an electric controller to avoid all interference with the functioning of the mechanically actuated centrifugal and vacuum advance systems. The present invention has wide utility since many engine operating parameters can effectively actuate electric switches. For example, a temperature sensitive electric switch can be used to sense overheating of the engine cooling system and control spark timing as a function of temperature. Engine speed can also be utilized as an operating parameter in accordance with the present invention. A centrifugally actuated electric switch can be driven from the output shaft of the transmission of a vehicle to vary the spark timing in one direction when a predetermined speed of the vehicle is reached and in an opposite direction as vehicular speed is reduced. A pressure responsive electric switch can also be mounted in a transmission hydraulic control circuit to vary the spark timing. Further, electronic control circuits can be utilized to initiate an electric signal for varying the spark timing in accordance with the invention. Thus the electric control spark timing system of the present invention is very versatile and combinations of electric switches can be utilized for controlling spark timing in response to variations in many different engine operating parameters or combinations thereof.

The present invention is also ideally suited to maintain an optimum value or level of an engine operating parameter by electrically controlling the "dithering" of the spark timing. Dithering of spark timing, defined herein as the continuous periodic variation of the spark timing within fixed limits and in a time phase relationship to an engine operating parameter, is known in the art. See Schweitzer U.S. Pat. No. 3,142,967. While the dithering effect has been accomplished primarily mechanically in the past, however, present invention affords simplified electric means for performing this function.

Basically, dithering provides a means for continuous sampling of whether the engine operating parameter would be improved if the spark timing were advanced or retarded from the average effective timing for the periodic dithering. In the Schweitzer patent mentioned hereinabove, the timing of the spark dithering is related to engine acceleration and deceleration and actuates other means for advancing or retarding the spark timing as the dithering continues but while producing a net average different timing in the direction of optimum timing to produce maximum engine speed. The present invention is capable of producing a similar effect but the dithering function is performed primarily by electrical rather than mechanical means.

The present ignition system comprises a dual breaker point distributor which is electrically wired to serve alternately as a single breaker point distributor and as a dual breaker point distributor. The addition and removal of the extended cam dwell angle afforded by the second set of points effectively change the spark timing or appropriately dither the spark timing an amount determined by the relative timing of the two sets of points. The normal action of the distributor cam is used to open and close the dual sets of points. The first set of points is utilized continuously. The second set of points is wired to the first set by a circuit containing a set of contact points of a switch or relay or equivalent electronic circuitry (in contrast to the conventional single wire connection) so that the second set of points is either connected to or disconnected from the first set of points depending upon whether the relay points (or the like) are in an open or closed position. The electric switch, relay, electronic circuit or the like operates in response to some engine operating parameter. In situations where solid state electronic ignition is utilized, dual triggering circuits and elements thereof may be employed in accordance with the principles of the present invention in such a manner as to replace the dual points of a multi-breaker point distributor so that selective switching can be utilized to produce an electric dithering effect to change the spark timing in response to some engine operating parameter.

SUMMARY OF THE INVENTION

The present invention may be summarized as comprising an ignition system for an internal combustion engine, which system comprises a plurality of spark triggering mechanisms operative in response to the angular disposition of the engine output shaft to trigger a spark. The spark triggering mechanisms are operatively connected to the engine output shaft to operate respectively at mutually offset angular positions of the shaft. Electric circuitry is connected to the spark triggering mechanisms and includes a pair of contacts movable between open and closed positions and which, when in one of said positions, triggers a spark when a first of said spark triggering mechanisms is operated, and in the other of said positions triggers a spark when more than one of said spark triggering mechanisms has operated. Means are provided for selectively moving the contacts between said open and closed positions to vary the spark timing relative to the angular disposition of the engine output shaft.

In one embodiment of the invention the spark triggering mechanisms comprise the various sets of points of a multi-breaker point distributor. The contacts may be open and closed by means of a commutator or by a mechanism responsive to variations in an engine operating parameter.

In another embodiment a commutator or the like is used to continuously periodically open and close a pair of contacts to correspondingly advance and retard the spark timing about a variable zero spark timing position and means responsive to variations in an engine operating parameter are utilized to vary the zero timing position to achieve an optimum value or level of the engine operating parameter.

Objects of the present invention are to provide a primarily electrically controlled spark dithering system to avoid any interference with the primarily mechanically actuated centrifugal and vacuum spark control mechanisms of a breaker point distributor, to provide optimum spark timing relative to a given engine operating parameter regardless of varying engine operating conditions, to provide an improved spark control system to which conventional multi-breaker point distributors can be easily adapted, to provide means for reducing and controlling exhaust emissions from an internal combustion engine over varying operating conditions and to provide a relatively inexpensive and troublefree spark control system.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWINGS

FIG. 1 is a partially schematic view of an ignition system for an internal combustion engine including electrically operated means for varying spark timing in accordance with the principles of the present invention.

FIG. 2 is a schematic view of a portion of another embodiment of the system shown in FIG. 1.

FIG. 3 is a schematic view of a spark control mechanism useful in an ignition system similar to that shown in FIG. 1.

FIG. 4 is a partially schematic view of another embodiment of the invention and includes a three breaker point distributor as contrasted with the dual breaker point distributor shown in FIG. 1.

DESCRIPTION OF THE PREFERRED EMBODIMENT

The principles of the present invention have utility in any ignition system for an internal combustion engine which includes a plurality of spark triggering mechanisms arranged to trigger a spark in response to the angular disposition of the work output shaft of the engine.

One of the most common of such ignition systems comprises a breaker point distributor which includes a distributor shaft which is driven via a gear arrangement by the crank shaft of the engine and, with respect to a four-cycle engine, rotates at one-half the speed of the crank shaft. The distributor shaft has a cam mounted thereon which, as it rotates, opens and closes a pair of contacts. The contacts are connected in an electric circuit which generally includes, along with one or more spark plugs or the like, a battery, an induction coil and a condenser, as will be understood by those skilled in the art.

FIG. 1 illustrates a dual breaker point distributor indicated generally at reference numeral 10. Structurally, the distributor 10 is known in the prior art and includes a pair of breaker point assemblies 11 and 12. The breaker point 11 is wired to an induction coil 13 which in turn is connected to a battery or the like electric power source 14 by means of an ignition switch indicated schematically at reference numeral 16. A condebser 17 is also connected to the breaker point assembly 11 in a conventional manner.

The breaker point assemblies 11 and 12 are mounted on a breaker plate 18 which is housed within a body 19 of the distributor 10. The condenser 17 is also mounted on the breaker plate 18 within the confines of the distributor body 19.

The diameter of an outer wall 20 of the breaker plate 18 is less than the diameter of an inner wall 21 of the distributor body 19, thus enabling the breaker plate 18 to rotate concentrically within the distributor body 19.

The breaker plate 18 is rotatably mounted on a sub plate 22 by means of a bearing indicated at reference numeral 23. In addition, the sub plate 22 is centrally apertured at 24 to enable a distributor drive shaft 26 to be freely received therein. The shaft 26 is generally connected by suitable gear arrangement to the crank shaft of the engine and, in instances where the engine is of the four-cycle type, the distributor shaft 26 is arranged to rotate at one-half the speed of the crank shaft.

Mounted on the distributor shaft 26 for the purpose of actuating the breaker point assemblies 11 and 12 in synchronism with the rotation of the engine crank shaft is a cam member 27. The number of tips and flanks formed on the cam are generally equal to the number of cylinders in the engine. Each cam assembly comprises a rubbing block 28 which engages the cam 27 and which serves as a cam follower in periodically opening and closing a pair of contact points 29 and 30.

Each of the cam assemblies 11 and 12 is movably mounted on the breaker plate 18 by means of an adjustment pin 31. Thus the rubbing blocks 28 can be adjusted relative to one another as well as to the cam 27 so that the dwell angles of each cam assembly can be individually adjusted.

In multi breaker point distributors the breaker point assemblies are so adjusted as to have dwell angles which are different from but which overlap one another, thereby extending the total effective length of dwell, as will be understood by those skilled in the art. To provide this increased total length of dwell the breaker point assemblies are generally wired to one another so that a spark is triggered not when the first or leading set of points 29 and 30 are opened, but only when the second or last set of points 29 and 30 are separated from one another.

The present invention also provides electric circuitry for connecting the breaker point assemblies 11 and 12, which circuitry is indicated generally at reference numeral 31. Instead of merely comprising a single conductor or wire, however, the circuit 31 comprises a first wire 32 connected to breaker point assembly 11 and a second wire 33 which is connected to breaker point assembly 12. Interposed between the wire 32 and 33 is a switch mechanism 34 comprising a pair of relatively movable contacts 36 and 37.

The contact 36 is mounted on a movable arm 38 of a solenoid mechanism 39 which is connected in series with a power source 40 and a switch mechanism controller 41. As discussed more fully hereinafter, the switch or circuit controller 41 may comprise any device having a switching function and may, for example, open and close its contacts in response to variations of any predetermined engine operating parameters.

The movable arm 38 of the induction coil assembly 39 may be arranged to normally open the contacts 36 and 37 and only close the contacts upon energization of the coil 39 in response to actuation of the switch mechanism 41 to close its contacts. Thus, when the pair of contacts 36 and 37 are in an open position, for example, as shown in FIG. 1, the breaker point assemblies 11 and 12 are not electrically interconnected. In that circumstance the distributor 10 operates as a single breaker point distributor rather than a dual point distributor. In that event, when the contact points 29 and 30 of the breaker point assembly 11 are open, a spark is triggered, even though the contact points 29 and 30 of the breaker point assembly 12 are still closed.

When the contacts 36 and 37 are closed, however, because of the energization of the coil 39, the distributor 10 operates as a dual breaker point distributor. Thus, a spark is not triggered immediately upon the opening of the contacts 29 and 30 of the breaker point assembly 11 but only when the contacts of the breaker point assembly 12 are also opened. Thus, the net dwell period of the distributor 10 is increased by the phase angle by which the breaker point assembly 11 leads the breaker point assembly 12. The spark is actually triggered and timing occurs when the last set of contact points opens, in this case, the contacts 29 and 30 of the breaker point assembly 12. Thus, when the distributor 10 operates as a dual breaker point distributor the spark timing is retarded by exactly the phase angle between the breaker point assemblies 11 and 12 as contrasted with the timing thereof when serving as a single breaker point distributor.

The operating device 41 may comprise any one of a number of sensing devices responsive to variations in engine operating parameters. For example, the device 41 may serve as an exhaust emission spark control switch and may include a sensing device responsive to variations in the constituent parts of the exhaust emissions. Thus, the spark timing may be electrically relatively advanced or retarded in response to such emissions variations and this relative change in spark timing is superimposed upon and has no effect on the timing control function of the mechanically actuated centrifugal and vacuum timing control mechanisms.

The circuit controller 41 may also comprise, for example, a temperature responsive switch mechanism which is subjected to the temperature of the engine coolant for relatively advancing and retarding the spark timing in response to variations in engine temperature.

The device 41 may also comprise a speed responsive switch for advancing and retarding the spark timing in response to speed variation. Since fluid pressure in the transmission of most vehicles also varies as a function of speed, the device 41 could comprise a pressure responsive switch to control spark timing also as a function of engine speed.

Referring to FIG. 2, in which reference numerals similar to those used in FIG. 1 are used to denote similar parts, a switch mechanism 41a is used to directly connect and disconnect the conductors 32 and 33, in contrast to the arrangement shown in FIG. 1 in which the switch mechanism 41 merely energizes or deenergizes the induction coil 39. In the arrangement shown in FIG. 2, of course, the contacts of the switching device 41a must be capable of withstanding line current in the manner of contacts 36 and 37 of the arrangement shown in FIG. 1. It will be appreciated that the switching mechanism 41a may be arranged to operate in response to variations in any one of the number of engine operating parameters, such as engine temperature, engine speed, exhaust emission makeup and the like.

The principle of selectively electrically advancing and retarding spark timing by alternately connecting and disconnecting the breaker point assemblies of a multi-breaker point distributor may also be utilized to maintain an optimum condition of an engine operating parameter, to the extent that variations in ignition timing are capable of maintaining such optimum condition. Although the spark timing can be varied in accordance with variations of any parameter, for purposes of illustration, the parameter chosen in further explanation of the invention is engine speed.

Thus, the principles of the present invention may be effectively utilized to maintain maximum engine speed, to the extent that variations in timing have an effect on engine speed, under varying engine operating conditions.

Referring to FIG. 3, reference numerals 32 and 33 indicate the electric wires connected respectively to the breaker point assemblies 11 and 12 of an ignition system shown, for example, in FIG. 1. Reference numeral 18 indicates schematically the movable breaker plate 18 of FIG. 1 on which the breaker point assemblies 11 and 12 are mounted.

In accordance with the principles of the embodiment of the invention shown in FIG. 3, the ignition timing is continuously advanced and retarded about a variable zero timing position by alternately connecting and disconnecting the breaker point assemblies 11 and 12.

Thus, as shown in FIG. 3, a commutator assembly 42 is mounted on a rotatable shaft 45 and comprises an electrically insulated cylinder 43 on which is secured an electrically conductive plate 44 which extends 180° around the periphery of the cylinder 43. The wires 32 and 33 are connected to a pair of spring biased contacts 46 and 47 which respectively engage the non-conductive portion of the cylinder 43 through one-half revolution thereof, thus disconnecting the breaker point assemblies 11 and 12, and then engage the conductor plate 44 through the remaining half revolution of the cylinder 43 to electrically connect the breaker point assemblies 11 and 12.

Shaft 45 is connected to the crankshaft, by any suitable drive connection 45a, for rotation at ¼ crankshaft speed (as compared to ½ crankshaft speed of the distributor shaft 26. Thus, with a four-cycle engine, for example, rotation of the shaft 45 serves to continuously connect and disconnect the breaker point assemblies 11 and 12 to constantly vary the ignition timing between the limits afforded by the dwell angles of the assemblies 11 and 12.

Also mounted on the shaft 45 is a switching device schematically shown at reference numeral 48 which may be conveniently referred to as an accelerometer. The device 48 comprises a fixed electrical contact 49 and a pair of movable contacts 50 and 51. The contacts 50 and 51 are constructed and arranged so that neither engages the fixed contact 49 as the shaft 45 is rotated at constant speed but one of the contacts, say, contact 50, engages the fixed contact 49 when the shaft 45 is accelerating while the other contact 51 engages fixed contact 49 when the shaft 45 is decelerating.

Connected to the movable breaker plate 18 is an operating arm shown schematically at reference numeral 52 into which a rotatable operating stud 53 of a small electric motor 54 is threaded. The motor 54, which may be of micromotor size, is fixed stationarily with respect to the distributor housing. Three contacts indicated at 56, 57 and 58 are mounted on the motor 54, contact 56 being continuously connected to the fixed contact 49 of the accelerometer 48 through a conductor 59 to which is connected a power source 60.

Conductors 61 and 62 are connected respectively to contacts 57 and 58 and are in turn connected to the movable contacts 50 and 51 through an alternator mechanism indicated generally at reference numeral 63.

The alternator 63 comprises a pair of insulated cylinders 64 and 66 which are mounted for joint rotation on the shaft 45 along with the commutator 42 and the accelerometer 48.

Mounted on each of the cylinders or drums 64 and 66 is a circumferentially continuous electrically conductive band 67 and a pair of semi-circular bands 68 and 69. The bands 68 and 69 both extend around the mutually opposite sides of the drums 64 and 66, with bands 68 being aligned with the conductive band 44 of the commutator 42 and the bands 69 being arranged in alignment with the non-conductive portion of the commutator 42.

The movable contact 50 of the accelerometer 48 is connected to a contact 70 through a wire 71 while the movable contact 51 is connected to another contact 72 through a wire 73. Contact 70 is constantly biased into engagement with the continuous band 67 of the drum 64 whereas the contact 72 constantly engages the band 67 of the drum 66.

Another pair of contacts 74 and 76 are associated with the drum 64 whereas contacts 77 and 78 are associated with the drum 66. The contacts 74 and 78 are connected to the motor contact 57, whereas contacts 76 and 77 are connected to motor contact 58.

As the motor contact 57 is energized the threaded stud 53 will rotate in one direction to pivot the breaker plate 18 about the bearing 23, thus correspondingly advancing (or retarding, as the case may be) the ignition timing. On the other hand, energization of the motor contact 58 will have the effect of rotating the stud 53 in an opposite direction, thereby pivoting the breaker plate 18 in an opposite direction to adjust the timing in an opposite manner.

The arrangement shown in FIG. 3 operates as follows. As the distributor shaft 26 rotates twice for one revolution of the commutator 43, the commutator 43 will connect the breaker point assemblies 11 and 12 shown in FIG. 1 through one revolution of the distributor shaft 26 and disconnect the breaker point assemblies through the next revolution. This, of course, has the effect of alternately advancing the spark through one revolution and retarding the spark through the other revolution.

The accelerometer 48 senses acceleration and deceleration of the commutator shaft 45, the speed of which corresponds to one-fourth the speed of the engine crank shaft. As the ignition timing constantly varies due to the dithering effect of the commutator 42 connecting and disconnecting the breaker point assemblies 11 and 12 the accelerometer 48 will sense whether an advance in ignition timing causes an acceleration or deceleration of the commutator shaft 45. If an advance in timing has the effect of increasing engine speed, the motor 54 will be energized in a manner to pivot the breaker plate 18 in a direction to advance the zero timing position of the breaker point assemblies 11 and 12. On the other hand, if an advance in timing has the effect of slowing down engine speed, the motor 54 will effectively pivot the breaker plate 18 to retard the zero timing position. To illustrate, assume the parts are in the relative disposition thereof shown in FIG. 3, at which the breaker point assemblies 11 and 12 are electrically connected to relatively retard the timing of the spark due to the increase in the total length of dwell. If such momentary spark retardation has the effect of accelerating engine speed, the movable contact 51 will engage the fixed contact 49 of the accelerometer 48, thus energizing the motor contact 57 by virtue of the contacts 70 and 74 of the drum 64.

As a consequence the motor 54 will rotate the threaded stud 53 to pivot the breaker plate 18 in a direction to retard the spark timing. This period of variation in spark timing actually has the effect of retarding the variable zero or neutral position of the timing about which the constantly varying timing dithers. The dithering constantly continues, however, and if further retardation of the zero position of the timing will cause a deceleration in engine speed, the motor contact 58 will become energized to effectively pivot the breaker plate 18 to a more advanced position.

The action of arm 52 for rotating breaker plate 18 in FIG. 3 has replaced the action of the normal method of vacuum advance by an arm from the vacuum advance unit. In the event that normal vacuum advance is to be retained, the arm 52 can be rearranged so as to rotate the entire distributor by being connected to the distributor body and providing for the whole distributor to rotate in its mounting to the engine. In this way, the rotation of the distributor within a prescribed arc will produce the desired advance or retard as noted above. Motor 54 would be fixed stationarily with respect to the engine.

As a consequence the timing is continuously adjusted to maintain maximum engine speed. The timing control afforded by the present invention is effective under all engine operating conditions and has the added advantage of being superimposable over the timing control afforded by the conventional mechanically operated centrifugal and vacuum timing controllers.

The arrangement shown in FIG. 3 may be applied to any multi-breaker point distributor including the dual point distributor shown in FIG. 1. In some instances, however, advantages may reside in the utilization of a distributor having more than two breaker points.

Thus in FIG. 3 a three breaker point distributor is disclosed. The distributor, identified at reference numeral 10a, comprises three breaker point assemblies 11a, 12a and 13a. Except for the addition of a third breaker point assembly and the mounting of a condenser 17a on the outer wall of the distributor body, the distributor 10a is substantially the same as the distributor 10 shown in FIG. 1.

Wires 32a and 33a are connected to the breaker point assemblies 11a and 12a. A conductor wire 79 is similarly connected to the breaker point assembly 13a.

In accordance with the principles of the present invention distributor 10a can be utilized as a one-point, two-point or three-point distributor. Thus a selector switch 80 comprising a pivotally movable switch arm 81 is connected to the wire 32a. In the open position of the switch 80 (as shown in FIG. 4) the breaker point assembly 11a is not connected to the assemblies 12a and 13a and thus the distributor 10a functions as a single-point distributor.

In a second position of the switch arm 81, however, the breaker point assembly 12a may be connected to 11a and in a third position both assemblies 12a and 13a may be connected to breaker point assembly 11a.

The switch 80 may, of course, be actuated by a mechanism operative in response to variations in any predetermined engine operating parameter. In addition, of course, a commutator similar to the commutator 42 shown in FIG. 3 may be substituted for the switch 80 to continuously dither the spark timing in accordance with the principles of the invention exemplified in FIG. 3 of the drawings.

The use of three sets of breaker points introduces greater flexibility than that generally available from a dual set of points. For example, the three sets of points desirably may be of identical construction and mechanical function. By phasing the three sets of contact points about the actuating cam of the distributor three separate spark timings can be selected and switched electrically in response to a signal (or a combination thereof) provided by a switch (or a combination thereof) actuated by engine operating parameters, either directly or indirectly through electronic logic circuits or combinations of both, to position the spark timing to provide an optimum condition of a parameter over a wide range of varying operating conditions. Furthermore, the spark timing can be varied in response to varying operating conditions so that various engine operating parameters, capable of producing various combinations of desirable or undesirable reactions, can be used as the input signals to an electronic logic circuit to select which of the three spark timings is most appropriate. The timing can be changed between the three timing choices as the operating parameter input signals to the electronic circuit change.

As noted, this electronic controlled selection of spark timing can be superimposed over normal centrifugal speed scheduled spark advance plus any retained desirable vacuum spark advance function. Electric means for varying spark timing disclosed herein provides an extremely flexible and practical means providing an electronic control spark timing responsive to engine and vehicle operating parameter variations which effect overall performance and, quite importantly, exhaust emissions.

In using the three-point distributor shown in FIG. 4 with the optimum ignition adjuster disclosed in FIG. 3, two sets of points may be used primarily for dithering the spark timing (generally between a small spark timing variation such as 5° crankshaft rotation). The override of this dithering function by some engine parameter (such as speed) or electronic circuit as discussed hereinabove can retard the spark by the amount of the dither, thus either rendering the dither inoperative or driving its effect to a full retard position. However, the additional override provided by a third set of points can additionally and instantaneously retard the spark by a much greater amount than can the dithering effect alone. For example, the third set of points can serve to retard the spark by as much as 25° and even 30° of crankshaft rotation.

Although minor modifications might be suggested by those versed in the art, it should be understood that I wish to embody within the scope of the patent warranted hereon all such modifications as reasonably come within the scope of my contribution to the art.

What I claim is:

1. The method of varying the ignition timing of an internal combustion engine having a multi-breaker point distributor which includes at least two sets of breaker points arranged around the cam of a distributor shaft comprising the steps of positioning the breaker points with respect to the cam so that the individual dwell angles thereof are different from and overlap one another, providing electrical circuitry so that the breaker points may be alternately electrically connected and disconnected to correspondingly vary the total length of dwell and thus the ignition timing, and selectively electrically connecting and disconnecting the breaker points to provide variations in ignition timing.

2. The method defined in claim 1 including the steps of sensing an engine operating parameter and producing a signal as a function thereof, and electrically connecting and disconnecting the breaker points in response to said signal.

3. The method defined in claim 1 in which said breaker points are connected and disconnected during alternate revolutions of the distributor shaft.

4. The method of varying the ignition timing of an internal combustion engine to maintain maximum engine speed under varying operating conditions, said engine having a rotatable work output shaft and a multi-breaker point distributor including a distributor shaft, a cam mounted on the shaft and at least two sets of breaker points arranged with respect to the cam to have different and overlapping dwell angles and movable jointly with respect to the cam from a variable zero timing position to more advanced and retarded timing positions, said method comprising the steps of alternately electrically connecting and disconnecting the breaker points to continuously vary the total length of dwell and thus the ignition timing between relatively advanced and retarded timing positions, sensing acceleration and deceleration of the engine shaft and producing a signal which varies as a function thereof, and utilizing said signal to move said breaker points jointly with respect to said cam to adjust the zero timing position to provide maximum engine speed at existing operating conditions.

5. An ignition system for an internal combustion engine having a work shaft comprising
a multi-breaker point distributor having a distributor shaft, a cam driven by the shaft and at least two sets of breaker points movable individually relative to one another and to said cam to provide different and overlapping dwell angles and movable jointly with respect to said cam from a variable zero timing position to relatively advanced and retarded timing positions,
means including electric circuit means for alternately connecting and disconnecting said breaker points to continuously vary the total length of dwell and to alternately relatively advance and retard ignition timing,
means for sensing variations in the speed of the engine work shaft and for producing a signal which varies accordingly, and
means for receiving signal and for jointly adjusting said breaker points relative to said cam in response to variations in said signal to vary the zero timing position of the breaker points for providing maximum engine speed at existing operating conditions.

6. The invention as defined in claim 5 wherein said means for alternately connecting and disconnecting said breaker points comprises a commutator connected for rotation at ½ distributor shaft speed and ¼ engine speed.

7. The invention as defined in claim 6 wherein said last named means comprises
a pivotal breaker plate on which said breaker points are mounted, and
electrically operated motor means for pivoting said breaker plate.

8. An ignition system for an internal combustion engine to maintain a predetermined condition of an operating characteristic of the engine comprising
a multi-breaker point distributor having a distributor shaft, a cam driven by the shaft and at least two sets of breaker points movable individually relative to one another and to said cam to provide different and overlapping dwell angles and movable jointly with respect to said cam from a variable zero timing position to relatively advanced and retarded timing positions, means including electric circuit means for continuously oscillating the ignition timing by alternately connecting and disconnecting said breaker points,
means for sensing variations in the engine operating characteristic and for producing a signal which varies accordingly, and
means for receiving and utilizing said signal for jointly adjusting said breaker points to vary the zero timing position thereof in a manner to best maintain the predetermined condition of the engine operating characteristic.

9. The invention as defined in claim 8 wherein said means for connecting and disconnecting said breaker points comprises a commutator and said sensing means comprises an accelerometer, both of which are driven at a speed corresponding to one-fourth speed of the engine.

10. The method of varying the ignition timing of an internal combustion engine having a pair of spark triggering mechanisms operative in response to the angular disposition of the engine output shaft to trigger a spark in an ignition system comprising the steps of
operatively connecting the spark triggering mechanisms to the engine output shaft for operating same respectively in mutually offset angular positions of the engine output shaft,
providing an electric circuit connected to said spark triggering mechanisms including a pair of contacts movable between open and closed positions and which, when in one of said positions, triggers a spark when a first of said spark triggering mechanisms is operated, and when in the other of said positions, triggers a spark when both of said spark triggering mechanisms are operated, and
selectively moving said contacts between said open and closed positions to vary the spark timing relative to the angular disposition of the engine output shaft.

11. An ignition system for an internal combustion engine comprising a multi-breaker point distributor having a distributor shaft, a cam driven by the shaft and at least two sets of breaker points movable individually relative to one another and to said cam to provide different and overlapping dwell angles and movable jointly with respect to said cam from a variable zero timing position to relatively advanced and retarded timing positions,
means including electric circuit means for continuously oscillating the ignition timing by alternately connecting and disconnecting said breaker points,
means for sensing variations in a variable operating characteristic of the engine and for producing a signal which varies accordingly, and
means for receiving and utilizing said signal for adjusting said breaker points to vary the zero timing position in response to variations in the engine operating characteristic.

* * * * *